United States Patent
Carr

(10) Patent No.: US 11,135,599 B2
(45) Date of Patent: Oct. 5, 2021

(54) TWO ZONE DISPOSABLE PROCESS CONTACT CENTRIFUGE FOR BIO-SEPARATIONS

(71) Applicant: Robert B. Carr, Providence, RI (US)

(72) Inventor: Robert B. Carr, Providence, RI (US)

(73) Assignee: Robert Bret Carr, Durham, NC (US)

( * ) Notice: Subject to any disclaimer, the term of this patent is extended or adjusted under 35 U.S.C. 154(b) by 302 days.

(21) Appl. No.: 14/910,189

(22) PCT Filed: Aug. 7, 2014

(86) PCT No.: PCT/US2014/050164
§ 371 (c)(1),
(2) Date: Feb. 4, 2016

(87) PCT Pub. No.: WO2015/021286
PCT Pub. Date: Feb. 12, 2015

(65) Prior Publication Data
US 2016/0175854 A1 Jun. 23, 2016

Related U.S. Application Data

(60) Provisional application No. 61/863,074, filed on Aug. 7, 2013.

(51) Int. Cl.
*B04B 7/08* (2006.01)
*B04B 5/04* (2006.01)
(Continued)

(52) U.S. Cl.
CPC .............. *B04B 7/08* (2013.01); *B01D 21/262* (2013.01); *B04B 1/04* (2013.01); *B04B 5/0442* (2013.01)

(58) Field of Classification Search
CPC .......... B04B 5/0442; B04B 1/04; B04B 7/08; B01D 21/262
(Continued)

(56) References Cited

U.S. PATENT DOCUMENTS 2,593,294 A 4/1952 Goldberg
3,674,206 A * 7/1972 Wendt, Jr. ................ B04B 1/00
494/43

(Continued)

FOREIGN PATENT DOCUMENTS

CA 2529977 A1 * 6/2006 ............... B04B 1/00

*Primary Examiner* — Walter D. Griffin
*Assistant Examiner* — Shuyi S. Liu
(74) *Attorney, Agent, or Firm* — Lathrop GPM LLP; Gordon R. Moriarty

(57) ABSTRACT

A centrifugal separator recovers high specific gravity solids such as whole cells while at the same time enabling sedimentation of low specific gravity solids such as cell debris. The separator is provided with a dual zone separator liner with concentric separator shells or zones. Feed fluid is introduced into an inner shell. High specific gravity solids accumulate against the inner wall of the inner shell. Feed fluid flows into the coaxial outer shell where lower specific gravity solids accumulate on the inner wall of the outer shell under higher g-force relative to that within the inner shell for the same rotational speed. Feed fluid flows out an exit channel. Longitudinal, planar vanes are radially disposed between an outer shell inner wall and an inner shell outer wall. After centrifugation, feed fluid in the inner shell is drained, then accumulated solids are drained from the inner shell into an appropriate receptacle.

6 Claims, 6 Drawing Sheets

(51) Int. Cl.
    *B04B 1/04*     (2006.01)
    *B01D 21/26*    (2006.01)

(58) Field of Classification Search
    USPC .................................................. 494/37, 43
    See application file for complete search history.

(56) References Cited

U.S. PATENT DOCUMENTS

| | | | |
|---|---|---|---|
| 4,734,089 A * | 3/1988 | Cullis | A61M 1/3693 |
| | | | 494/27 |
| 4,983,158 A | 1/1991 | Headley | |
| 5,209,765 A | 5/1993 | Kolpak et al. | |
| 5,405,308 A | 4/1995 | Headley et al. | |
| 6,352,499 B1 | 3/2002 | Geigle | |
| 2006/0135338 A1* | 6/2006 | Zonneveld | B04B 1/00 |
| | | | 494/29 |
| 2010/0157899 A1 | 7/2010 | Carr | |
| 2010/0167388 A1 | 7/2010 | Kessler | |
| 2011/0003676 A1* | 1/2011 | Collier | B01D 17/0217 |
| | | | 494/23 |

\* cited by examiner

TWO ZONE DISPOSABLE PROCESS CONTACT CENTRIFUGE FOR BIO-SEPARATIONS

RELATED APPLICATIONS

The present application is a 35 U.S.C. § 371 national phase application of PCT International Application No. PCT/US2014/050164, filed Aug. 7, 2014, which claims priority from U.S. Provisional Application No. 61/863,074, filed Aug. 7, 2013, the disclosures of which are hereby incorporated herein in their entirety. PCT International Application No. PCT/US2014/050164 is published in English as PCT Publication No. WO 2015/021286.

BACKGROUND OF THE INVENTION

The present invention generally relates to centrifuges and in particular to a centrifugal separator for bio-separations.

Many different types of centrifugal separators are known for separating heterogeneous mixtures into components based on specific gravity. Typically, a heterogeneous mixture, which may also be referred to as feed material or fluid, is injected into a rotating bowl of a centrifugal separator. Such a feed material may encompass biological matter, such as whole cells in a culture medium. The rotating bowl spins at high speeds and forces components of the mixture that have a high specific gravity to separate by sedimentation. As a result, dense solids compress tightly as a cake against an inner surface or wall of the bowl and clarified liquid, or centrate, forms radially inward from the cake. The bowl may spin at speeds sufficient to produce forces 20,000 times greater than gravity so as to separate the solids from the centrate. As solids accumulate along the wall of the bowl, the centrate exits from the bowl and leaves the separator. Once a desired amount of solids has accumulated, the separator is placed in a discharge mode in which the solids are removed from the separator. Often, for example, an internal scraper is engaged to scrape the solids from the walls of the bowl.

Conventional separators have many shortcomings. Traditional separators subject a feed material to very high shear forces when accelerating the material to the rotational speed of the bowl since feed fluid typically enters the bowl at an axially aligned port that is then against the bowl wall. This can destroy sensitive chemical or biological substances such as intact cells.

In some systems, two solid phases are removed from a feed fluid, each having a distinct specific gravity and thus separating and accumulating at different rotational speeds. This has heretofore required the operation of a typical centrifuge at two different speeds, or required two different separators and the communication of a feed fluid therebetween.

Furthermore, conventional separators may be difficult to clean or sterilize in place requiring operations that significantly increase maintenance costs and creating the potential for cross contamination between different preparations.

The biotechnology and pharmaceutical industries have come to rely increasingly on disposable process components for production. Disposable, pre-sterilized sample contacting materials offer numerous advantages, including savings in time, labor, and cost for both initial set-up and turn-around between runs. They also dramatically reduce the risk of contamination and simplify process validation. Conventional production scale centrifugal separators suitable for processing cells and other biomaterials require particular care to clean and sterilize in place.

With respect to bio-separations, however, special handling is required. Present systems do not separate whole cells at low centrifugal speeds without overly compacting them and rendering them difficult to extract. In addition, known systems spin down cellular debris at lower speeds and do not provide maximum separation and compaction.

BRIEF SUMMARY OF THE INVENTION

In view of the foregoing, there is a need for a single centrifugal separator that provides zones of different g-forces during bowl rotation in order to maximize separation and compaction by spinning down cellular debris at higher speeds than those currently being implemented.

This design is particularly useful for mammal whole cell separation by capturing whole cells without breakage of their membranes because of shear and discharging very clear centrate liquid.

In accordance with the present invention, a centrifugal separator is disclosed that efficiently recovers high specific gravity solids such as whole cells while at the same time enables the sedimentation and maximal compaction of low specific gravity solids such as cell debris. This is achieved through the use of a dual zone separator liner comprised of concentric separator shells or zones. The liner is disposed within a reusable centrifuge bowl. A fluid pathway is provided for introducing feed fluid into a lower end of an inner shell. Advantageously, the smaller radius of this inner shell with respect to the bowl itself subjects the feed fluid to less stress as it enters the inner shell. During rotation, the smaller radius means that lower g-forces arc applied to the feed fluid with this inner shell. High specific gravity solids, such as whole cells, thus accumulate against the inner wall of the inner shell without excess compaction that would make them difficult to extract.

At an upper end of the inner shell, a disc shaped end wall is provided. The radius of the circular opening in the end wall defines how deep the fluid pool will be against the inner shell inner cylindrical wall during centrifugation. As solids and feed fluid pool within the inner shell, the level of fluid will approach the end wall edge and will then overflow. Fluid channels are provided in the inner shell end wall thereby enabling the feed fluid to flow into the outer shell. Because the inner wall radius of the outer shell is greater than the inner wall radius of the inner shell, feed fluid in the outer shell is subject to high g-forces. Consequently, lower specific gravity and smaller sized solids such as cell debris accumulate on the cylindrical inner wall of the outer shell. Once the space between the outer shell inner wall and the inner shell outer wall has become full of feed fluid and accumulated solids, the feed fluid flows out an exit channel for collection outside the centrifuge.

In order to maintain the inner shell in position with respect to the outer shell and the centrifuge bowl, plural planar vanes are radially disposed along the length of the centrifuge bowl between the outer shell inner wall and the inner shell outer wall. Each pair of plural vanes, along with the respective segment of outer shell inner wall and inner shell outer wall, form a fluid flow channel. These vanes also serve to stabilize the separation pool, improving separation.

At the completion of centrifugation, feed fluid in the inner shell is drained, then solids (e.g., whole cells) that have accumulated in the inner shell without breakage are allowed to drain from the inner shell into an appropriate receptacle. The liner may be reused for additional cell collection in repeated cycles. Once collection is complete, or the outer shell is filled with cell debris, the liner assembly is removed from the centrifuge bowl. In one embodiment, the liner assembly is extruded plastic and is intended to be disposable.

Thus, a multi-zone centrifuge and use thereof is disclosed. The centrifuge comprises a substantially cylindrical bowl having an axis of rotation therethrough, a first substantially cylindrical zone within the bowl and coaxial therewith, the first zone having an inner surface a distance R1 from the axis of rotation, a second substantially cylindrical zone within the bowl and coaxial therewith and in fluidic communication with the first zone, the second zone having an inner surface a distance R3 from the axis of rotation, wherein the first zone is within and coaxial with the second zone and, during rotation of the bowl, the centrifuge is configured to sequentially flow feed fluid from a first end of the first zone to a second end of the first zone and then from a second end of the second zone to a first end of the second zone.

In a further embodiment, disclosed is a disposable, multi-zone liner for a rotatable cylindrical centrifuge bowl, comprising a first cylindrical shell having inner and outer surfaces, a first end having a first feed fluid port therein, and a second end having a wall with a channel therein, the first shell having an axis of symmetry, a second cylindrical shell having inner and outer surfaces, a first end having a second feed fluid port therein, and a closed second end, the second shell being coaxial with the axis of symmetry and surrounding the first shell, and plural vanes disposed between the first shell outer surface and the second shell inner surface, each vane extending along a majority of the first shell between the first end and the second end thereof.

Also disclosed is a method of separating solids from liquid in a centrifuge providing regions of differing g-force, the method comprising the following steps. A centrifuge is provided, the centrifuge being comprised of a substantially cylindrical bowl having an axis of symmetry, a first substantially cylindrical shell having inner and outer surfaces, a first end having a first feed fluid port therein, and a second end having a wall with a channel therein, the first shell being coaxial with the axis of symmetry, a second cylindrical shell having inner and outer surfaces, a first end having a second feed fluid port therein, and a closed second end, the second shell being coaxial with the axis of symmetry and surrounding the first shell, and plural vanes disposed between the first shell outer surface and the second shell inner surface, each vane lying in a plane containing the axis of symmetry. The centrifuge is rotated at a separation speed. Feed fluid is introduced through the first feed fluid port into the first shell first end, and the feed fluid pools against the inner surface of the first shell and accumulates a high density fraction of solids suspended in the feed fluid. The feed fluid flows through the first shell second end channel and pools against the second shell inner surface between adjacent ones of the plural vanes and accumulating a low density fraction of solids suspended in the feed fluid. Feed fluid is then drained from the second feed fluid port once the feed fluid pooling in the second shell has reached the first shell outer surface.

Further disclosed is a method of separating a high density fraction of solids in a feed fluid from a low density fraction of solids in the same feed fluid. A liner is installed into a cylindrical centrifuge bowl, the liner comprised of coaxial, cylindrical separation zones separated by planar, radially extending vanes. The centrifuge is accelerated to a predetermined separation speed and the speed is maintained. The feed fluid is introduced into a first end of an innermost separation zone and pools against an inner surface of the innermost separation zone to a predetermined depth. The feed fluid is allowed to flow out of a channel in a second end of the innermost separation zone, coaxial with the separation zones, and into a second end of the outermost separation zone. The feed fluid pools against an inner surface of the outermost separation zone, between adjacent ones of the vanes, until the feed fluid reaches an outer surface of the innermost separation zone. Excess feed fluid is then drained from the outermost separation zone. The high density fraction of solids in the feed fluid accumulates on the inner surface of the innermost separation zone and the low density fraction of solids in the feed fluid accumulates on the inner surface of the outermost separation zone.

In one embodiment of the present invention, the liner assembly of the centrifugal separator is sterilized and provided in sterile packaging for insertion into a centrifuge bowl.

The present invention further provides a lower assembly for a centrifugal separator bowl that is, in one embodiment, disposable, wherein the lower assembly comprises a feed port or inner channel nipple and a centrate port or outer channel nipple, wherein the feed port connects to the inlet passageway of the bowl liner, and wherein the centrate port connects to the outlet passageway of the bowl liner.

Other aspects, features, and advantages of the present invention will be apparent from the Detailed Description of the Invention that follows.

BRIEF DESCRIPTION OF THE SEVERAL VIEWS OF THE DRAWINGS

The objects, features, and advantages of the invention will be apparent from the following description of embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figures 1A, 1B:
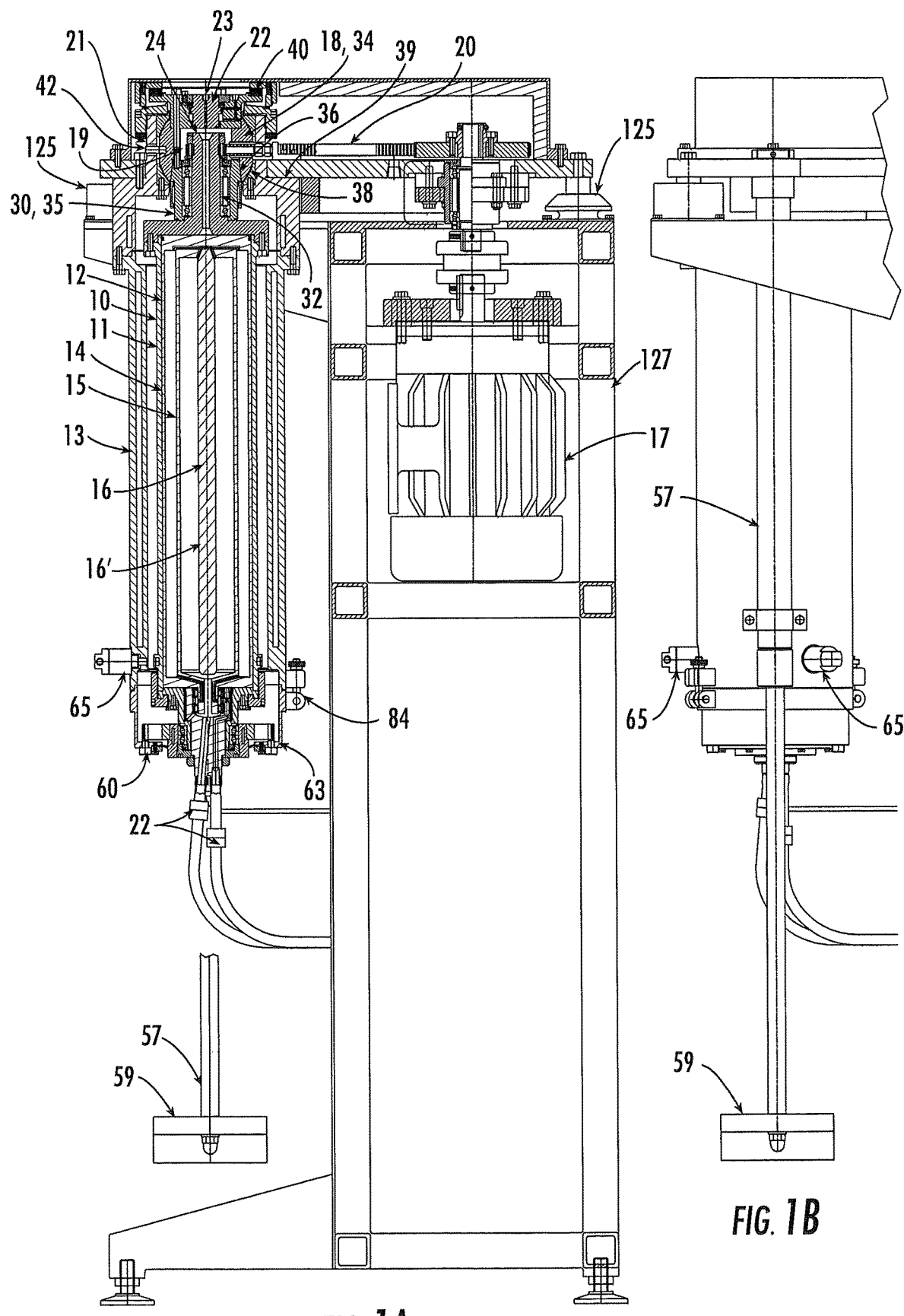
FIG. 1A is a section view of an embodiment of a centrifuge assembly having disposed therein a centrifuge with a two-zone disposable process contact bowl insert, according to the presently disclosed invention.
FIG. 1B is a fragmentary side view of the centrifuge of FIG. 1A.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1A shows a centrifugal separator in vertical section. The centrifugal separator includes a cylindrical separator bowl 10 mounted in a central region 11 of a separator housing 13. The separator bowl 10 is, in one embodiment, a substantially cylindrical, tubular type bowl. Mounted within the separator bowl 10 is a liner assembly or cartridge generally designated as 12. The liner assembly 12 is comprised of an outer shell 14 and an inner shell 15. The housing, bowl, and liner, including the outer and inner shells, are coaxial about an axis of symmetry 16, which is also an axis of rotation for the centrifuge bowl. A central core 16' is in the inner shell 15. The cartridge or liner assembly 12 will be discussed in greater detail below.

At an upper end of the separator, a variable speed drive motor 17 is connected to a drive pulley 19 of a spherically mounted bearing and spindle assembly 18. The connection is made by a drive belt 20 at a collar-like extension 21 of the upper end of the separator housing 13. The drive motor 17 is controllably operated to rotate the separator bowl 10 at desired speeds for separating the feed fluid. Feed fluid is comprised of a liquid portion and suspended solids. Liquids are fed and discharged via flexible tubing and sterile disconnects 22 as manufactured by Colder, Pall and others. These connections may be disposed of after single use.

A coupling actuator 22 selectively mates a fixed air pressure port 23 to a spindle shaft extension 24. When the centrifuge is configured for rotation, as shown in FIG. 1A, the coupling is in a raised position relative to the centrifuge and as such the coupling and the spindle shaft extension are not in contact. However, when the centrifuge is stationary, the coupling, along with the fixed air pressure port 23, may be lowered into air-tight communication with the spindle shaft extension. Once so coupled, compressed air (or any other desired gas) may be introduced into the port for the purpose of dislodging a removable bowl liner, as described in further detail below with respect to FIG. 6.

At the upper portion of the housing 13, the spherically mounted bearing and spindle assembly 18 comprises an upper bearing assembly 30 that engages a centrifuge spindle shaft 32 that extends upwardly from the separator bowl 10. In this embodiment, the upper bearing assembly 30 includes a semi-spherical upper portion 34, a short cylindrical middle position 35, and a semi-spherical lower portion 36. Optionally, the semi-spherical portions can rest against mating surfaces of one or more complimentarily shaped seats 38 of a self-lubricating material such as Teflon. The seats themselves may be fixedly attached to the housing. An exemplary semi-spherical portion that can be employed in a separator of the invention has been described by U.S. Pat. No. 6,986,734, which is hereby incorporated by reference. The upper bearing itself may also include an oscillation restraint ring 40 formed of a resilient material such as rubber. One or more anti-rotation pins 42 may also be provided in conjunction with the upper bearing assembly 30. Also shown in FIGS. 1A and 1B is a crosshead 59 and hydraulic cylinders 57 (e.g., water-driven) used for insertion and extraction of the inner cartridge, further explained in connection with FIG. 6. Small air cylinders 65 serve to lock the bowl during cartridge removal as also explained in connection with FIG. 6. The entire machine is mounted on vibration isolators 125 and stainless steel frame 127.

Figure 2:
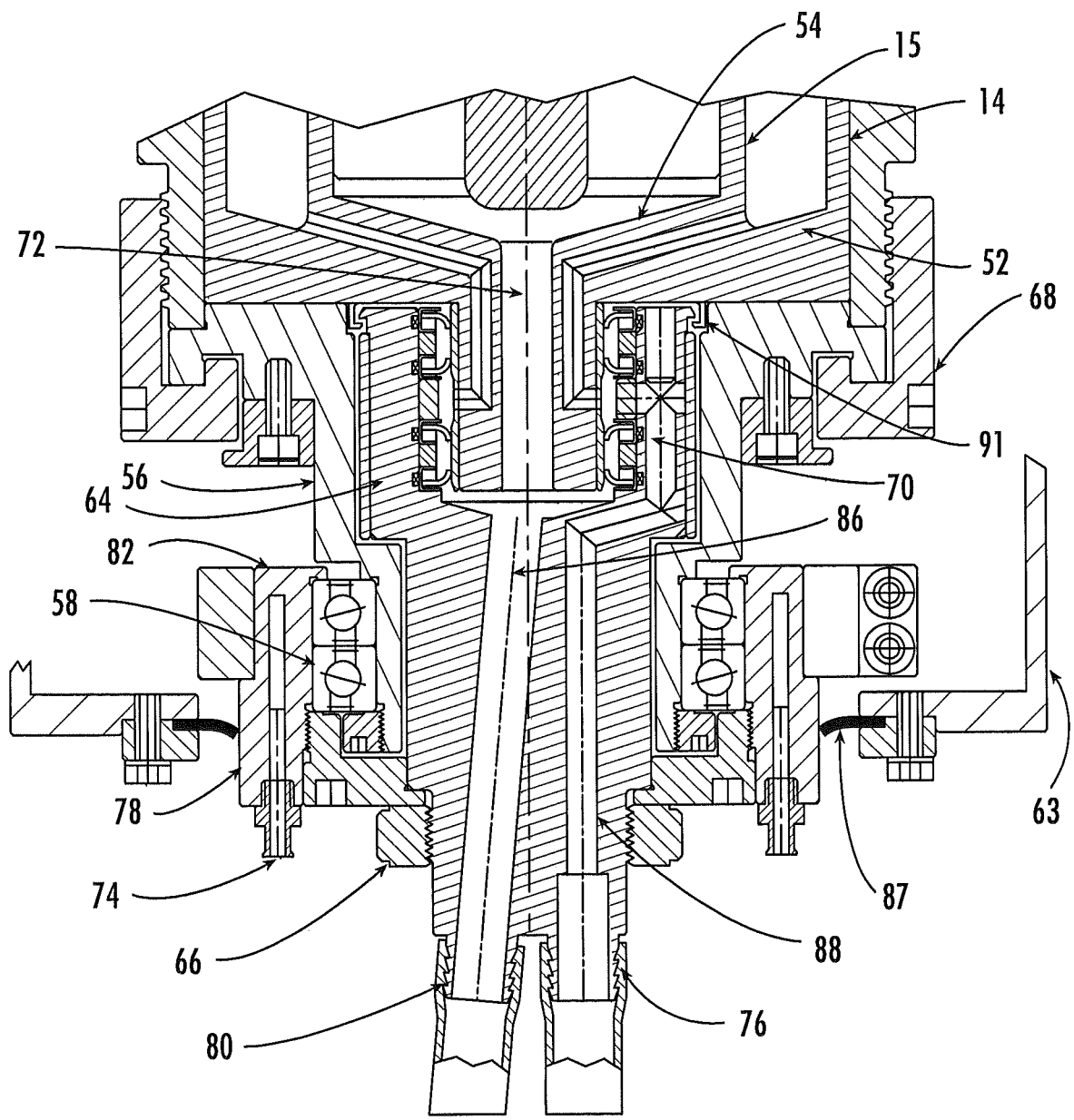
FIG. 2 is a section view of a lower extent of the centrifuge and insert of FIG. 1A.

With respect to FIG. 2, the lower portion of the liner inner shell 15 includes a lower extent 54 having a frustoconical upper surface in communication with an inner fluid channel 72 formed within a substantially cylindrical, downwardly extending inner region 86 and directly in communication with an inner channel nipple 80. The channel 72 defines a fluid port (e.g., a feed fluid port) at the lower extent 54 of the inner shell 15. Similarly, the liner outer shell 14 has a lower extent 52 with a frustoconical upper surface in communication with an outer fluid channel 70 formed within a substantially cylindrical, downwardly extending outer region 88 and indirectly in communication with an outer channel nipple 76. The channel 70 defines fluid port(s) (e.g., feed fluid port(s)) between the lower extents 52, 54. Each nipple is adapted for receiving and sealably mating with a respective hose or other fluid conduit. A rubber, non-rotation seal 87 excludes dirt from the lower cap 63.

The outer shell lower extent 52 is supported from beneath by a lower bearing assembly 82. Specifically, a lower bearing assembly inner collar 56 abuts the outer shell lower extent and is itself held in place in the bowl 10 by a threaded lock ring 68 that mates with cooperating threads on the exterior surface of the bowl. The lower bearing assembly inner collar is adapted for rotation with the centrifuge bowl and is in rotational contact with lower bearings 58. The lower bearings are disposed within a lower bearing assembly outer collar 78 which is water cooled by nipples 74. The lower bearing assembly outer collar 78 is kept from rotating by plural threaded pins 60 (FIG. 1) (e.g., plastic pins) that extend from lower housing cap 63 (FIG. 1) held against the lower extent of the housing 13 by lower swing bolts 84 (FIG. 1).

Mounted into the lower bearing assembly 82 and the collar 56 is a lower seal assembly 64. Lip seals are water cooled and flexible so that high speeds can be achieved without heat generation that can damage sensitive liquids with proteins. A slightly higher pressure differential between the seal lips and the process cavities prevents the process liquid migrating into or between the lips. Note that the seal assembly 64 is held in place by plastic "snap fingers" such that aseptic containment is maintained when installing or removing the cartridge. The seals separate the inner and outer fluid channels as well as keep the inner and outer channels separated from the environment. The bearing assembly 82 and various housing 13 support structures are metal in a first embodiment, while the collar 56 is plastic and intended to be disposable along with the cartridge. One skilled in the art will realize that other materials may be used for the various components of the presently disclosed system.

Figures 3A, 3B, 3C:
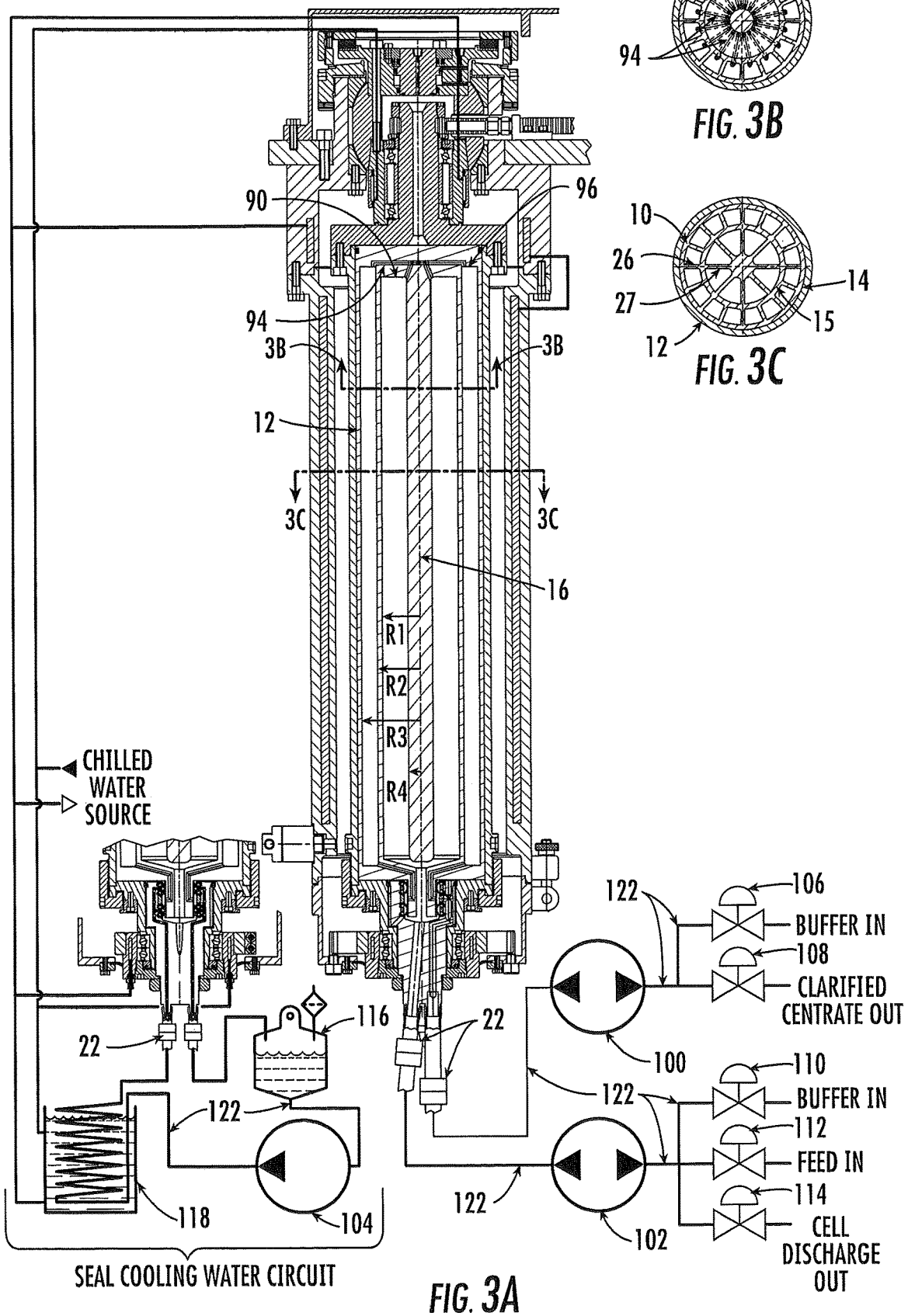
FIG. 3A is a flow schematic for the centrifuge and insert of FIG. 1A.
FIGS. 3B and 3C provide section views of the centrifuge and insert of FIG. 1A.

Cross-sectional views of the bowl liner assembly 12 are illustrated in FIGS. 3B and 3C. The outer shell 14 is substantially cylindrical and is disposed within the bowl 10 about the axis of symmetry 16. The outer shell 14 may also be referred to as an outer zone. The inner shell 15 is substantially cylindrical and is disposed within the outer shell 14 about the axis of symmetry. The inner shell may also be referred to as an inner zone. The distance between the axis of symmetry and the inner shell inner surface is referred to as $R_1$. The distance between the axis of symmetry and the inner shell outer surface is referred to as $R_2$. The distance between the axis of symmetry and the outer shell inner surface is referred to as $R_3$. Since centrifugal force increases, for the same rotational speed, with the distance from the axis of rotation, feed fluid (including centrate or feed liquid) and solids suspended therein are subject to relatively lower centrifugal force at $R_1$ than at $R_3$. The use and benefit of having two centrifugal zones within a single centrifuge bowl is described in detail below.

The lower ends of the inner and outer shells (when the axis of symmetry is vertically aligned as it would be in use) have frustoconical surfaces to facilitate the introduction of feed fluid (inner shell), and the draining of fluid (outer shell) or solids (inner shell). An upper end wall 96 of the outer shell is a substantially planar wall in a first embodiment. The upper end wall 90 of the inner shell, also shown in FIG. 3B, is provided as a planar disc. Plural channels 94 are formed in an upper surface of or through the inner shell upper end wall, a portion of the channels being substantially parallel to the lower surface of the upper end wall. The channels provide a fluid pathway between the interior of the inner shell and the interior of the outer shell. The upper end wall of the inner shell is attached to or formed integrally with the upper end wall of the outer shell, thus rigidly centering the inner shell within the outer shell.

Disposed between an outer surface of the inner shell ($R_2$) and an inner surface of the outer shell ($R_3$) are plural planar vanes 26 and, in some embodiments, on the inner surface of the inner shell are vanes 27. In a first embodiment, each vane lies in a plane that also contains the axis of symmetry. Thus, each vane extends orthogonally from, or is normal to, the tangent plane at the inner shell junction and the outer shell junction. Each vane extends lengthwise from proximate a lower end of the inner and outer shells to the upper wall 96 of the outer shell. Thus, the inner shell is rigidly supported within the outer shell and is capable of resisting deformation during high speed centrifugation, particularly when solids are accumulated on the inner shell inner surface. In the illustrated embodiment, eight vanes evenly axially distributed are provided between the inner shell and outer shell. The channels formed in the inner shell upper end wall are oriented to provide a fluid pathway into each space defined by the outer shell inner wall, the inner shell outer wall, and each pair of adjacent planar vanes. The radius $R_4$ is where the upward flow through the inner chamber will flow in a thin layer right against the $R_3$ surface due to Coriolis acceleration effects. This will stabilize the fluid flow and allow for more complete filling of the chamber. The same is true for $R_2$ and flow in the outer chamber.

The liner assembly 12 comprised at least of the outer shell 14, outer shell upper end wall 96, outer shell lower extent 52, inner shell 15, inner shell upper end wall 90, inner shell lower extent 54, and the plural planar vanes 26 and/or the vanes 27 is, in a first embodiment, formed as a unitary structure. The unitary structure may be plastic, and further may be formed by plastic extrusion. The separator bowl 10 is provided as a metal cylinder in one embodiment, though other rigid materials can be employed.

The flow schematic shown in FIG. 3A comprises reversible peristaltic pumps for feed, centrate and the seal cooling circuits. The pumps are available from Masterflex, for example. All process contact tubing 122 is pharmaceutical grade silicone including the seal cooling water circuit. The tubing runs through the peristaltic pumps and the pinch-type valves 106-114. When the process is complete, all this tubing is disposed with the separation cartridge. For the seal cooling water circuit there is a commercially available plastic bag reservoir full of water for injection (WFI) that has a sterilizing (e.g., 0.2 micron) vent filter. This is disposable with all the process tubing. For this circuit there is a stainless steel tank 118 with a coil of seal cooling tubing in it that is also supplied with facility chilled water. Chilled water is also supplied to the seal assembly, lower and upper bowl case, and the main bearing assembly. All these zones can be individually controlled with the addition of valves and temperature sensors.

Figure 4:
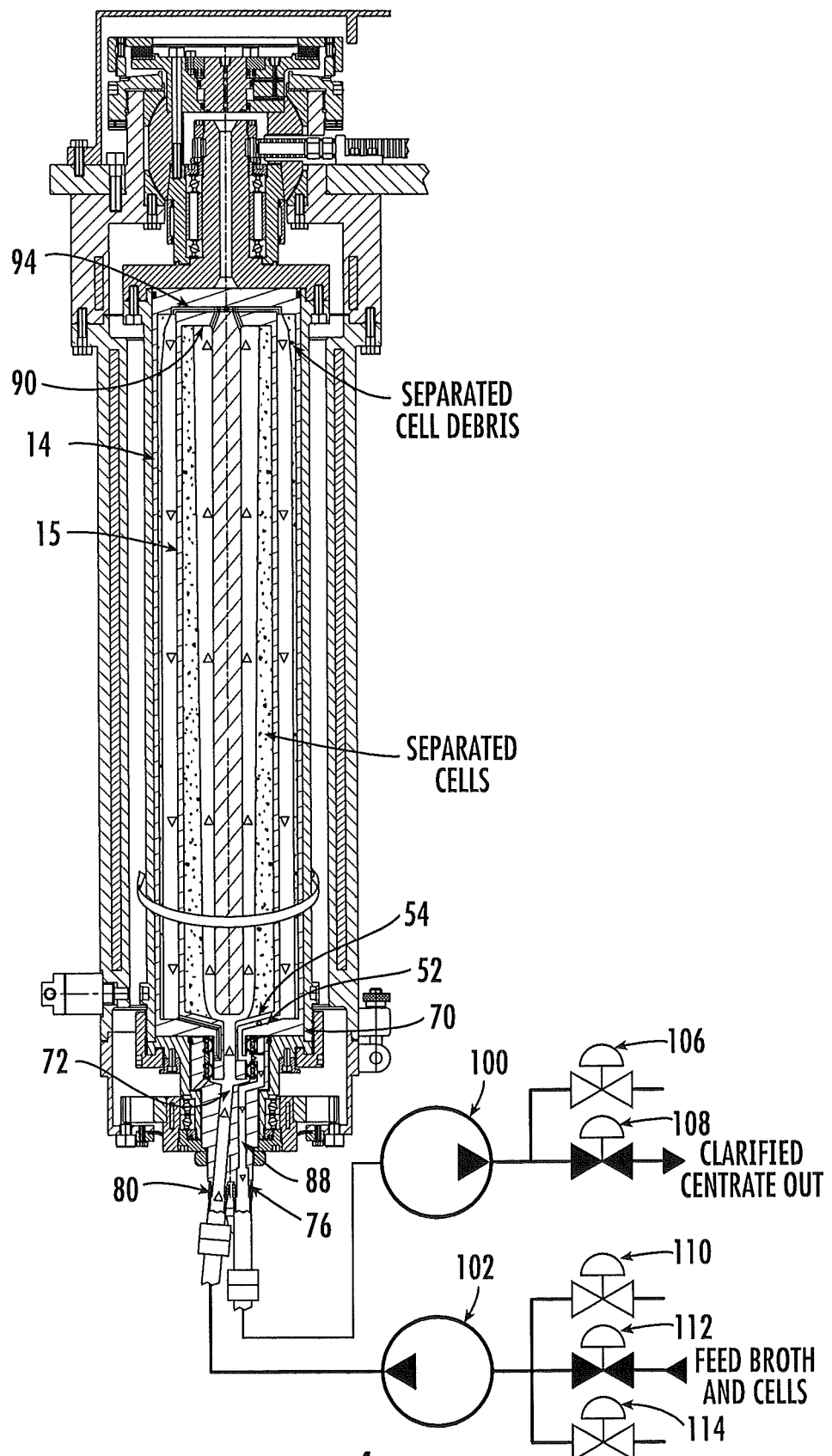
FIG. 4 is a section view of the centrifuge and insert of FIG. 1A in a feed and separation mode of operation.

A feed mode of operation of the centrifugal separator is described with reference to FIG. 4. The separator bowl 10 rotates under the influence of the drive motor 17. Feed fluid is introduced through the inner channel nipple 80. In one embodiment, feed fluid is comprised of a liquid and suspended solids such as cells and cell debris. The feed fluid flows from the inner channel nipple 80 through the inner fluid channel 72, and upon reaching the end of the inner fluid channel enters the inner shell, also referred to as the inner zone or innermost separation zone. The fluid initially passes across the frustoconical surface of the inner shell lower extent 54 and begins pooling along the vertical length of the inner shell inner surface ($R_1$). As more fluid fills the inner zone, solids of a relatively high specific gravity, such as whole cells, begin to accumulate on the inner surface of the inner shell 15, forming a mass of solids, with fluid bearing unseparated solids forming a pool on top thereof. Specifically, in one embodiment, the whole cells are mammalian Chinese Hamster Ovary (CHO) cells.

When enough feed fluid has entered the inner shell 15, feed fluid passes through the channels 94 between the inner and outer shells. This feed fluid then begins filling the plural fluid pathways within the outer shell 14, each defined by the respective portion of the outer shell inner surface, inner shell outer surface, and between two adjacent planar vanes 26. Ideally, sufficient feed fluid will have been introduced into the centrifuge whereby the plural fluid pathways within the outer shell become full. As noted, solids having a relatively higher specific gravity separate from the feed fluid under the relatively lower centrifugal force within the inner shell. Solids having a lower specific gravity and smaller particle size and remaining in the feed fluid once it has entered the outer shell are subject to relatively higher centrifugal force due to $R_3 > R_1$ and begin accumulating on the inner wall of the outer shell. Beneficially, the higher g-force within the outer shell causes the cell debris to be compacted.

The remaining feed fluid or centrate is clarified of entrained solid particles by the high centrifugal force acting upon the liquid and thus is referred to as clarified centrate. Once the outer shell is full, clarified centrate begins passing across the frustoconical upper surface of the outer shell lower extent 52 and then into the cylindrical outer fluid channel 70 defined by the outer region 88, then into the outer channel nipple 76. During this time, pumps 100 and 102 are running at the same rate. Pinch valves 108 and 112 are open.

To prevent cell breakage during the bowl filling phase, the bowl can be filled with buffer liquid before the feed is introduced.

The presently disclosed centrifuge allows for the harvesting of the whole cells or other material of relative high specific gravity that have been deposited within the inner shell 15. The centrifuge may be deemed sufficiently full of solids when, for example, clarified centrate begins exiting the centrate outlet and a sensor informs the control system that it is time to discharge solids. Alternatively, feed fluid may continue to be introduced into the inner fluid channel until the centrate leaving the centrifuge is determined to have reached a desired degree of turbidity, suggesting insufficient space is available in the inner shell for solids accumulation. Further still, feed fluid may continue to be introduced until pressure at the inner channel nipple 80 or in the inner fluid channel 72 begins rising, suggesting that high specific gravity solids have begun filling the inner shell, restricting the in-flow of additional feed fluid. Finally, empirical measurements may have been gathered for a given sample of feed fluid such that an optimal amount of introduced feed fluid and/or centrifugation time is known in advance.

Figure 5:
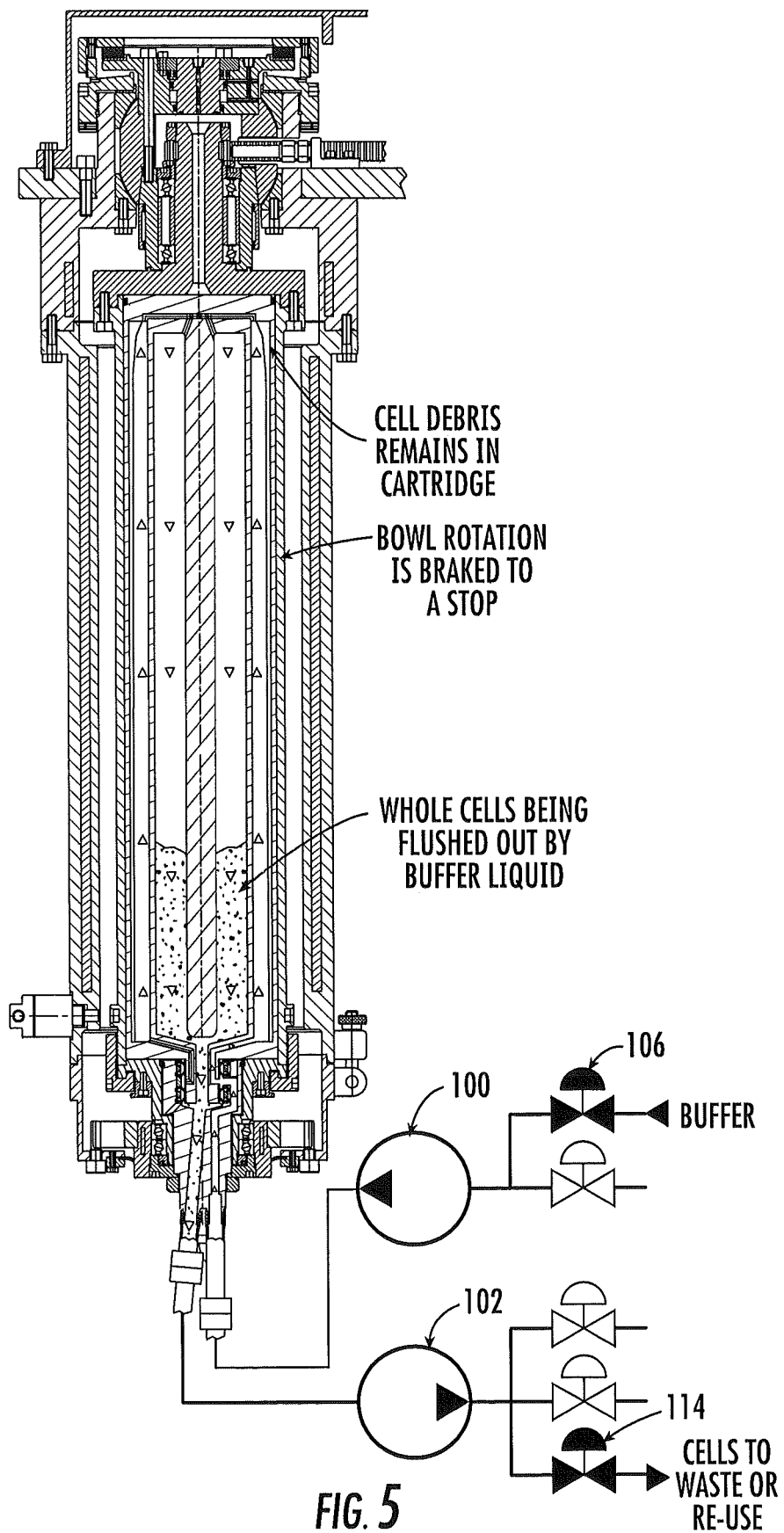
FIG. 5 is a section view of the centrifuge and insert of FIG. 1A in a discharge mode of operation.

Once the centrifuge is determined to have accumulated a sufficient quantity of the desired high-specific gravity solids in the inner shell, the introduction of feed fluid through the inner channel nipple 80 is ceased and the outflow of clarified centrate through the outer channel nipple 76 is stopped, and the bowl rotation is braked to a stop. With respect to FIG. 5, the flow is reversed in pumps 100 and 102 and valves 106 and 114 are open, allowing whole cells to be flushed out of the inner chamber 15 with buffer liquid into a suitable receptacle (not shown).

Once the whole cells from the inner shell 15 have been removed, flow is again reversed for a feed mode. The accumulated solids in the outer shell 14, which are cell debris in a first embodiment, cannot be discharged by flushing so they remain until this chamber is full. This may be repeated until it is determined or predicted that a limiting amount of debris has accumulated in the outer shell, thus requiring the removal and replacement of the liner assembly 12.

Figure 6:
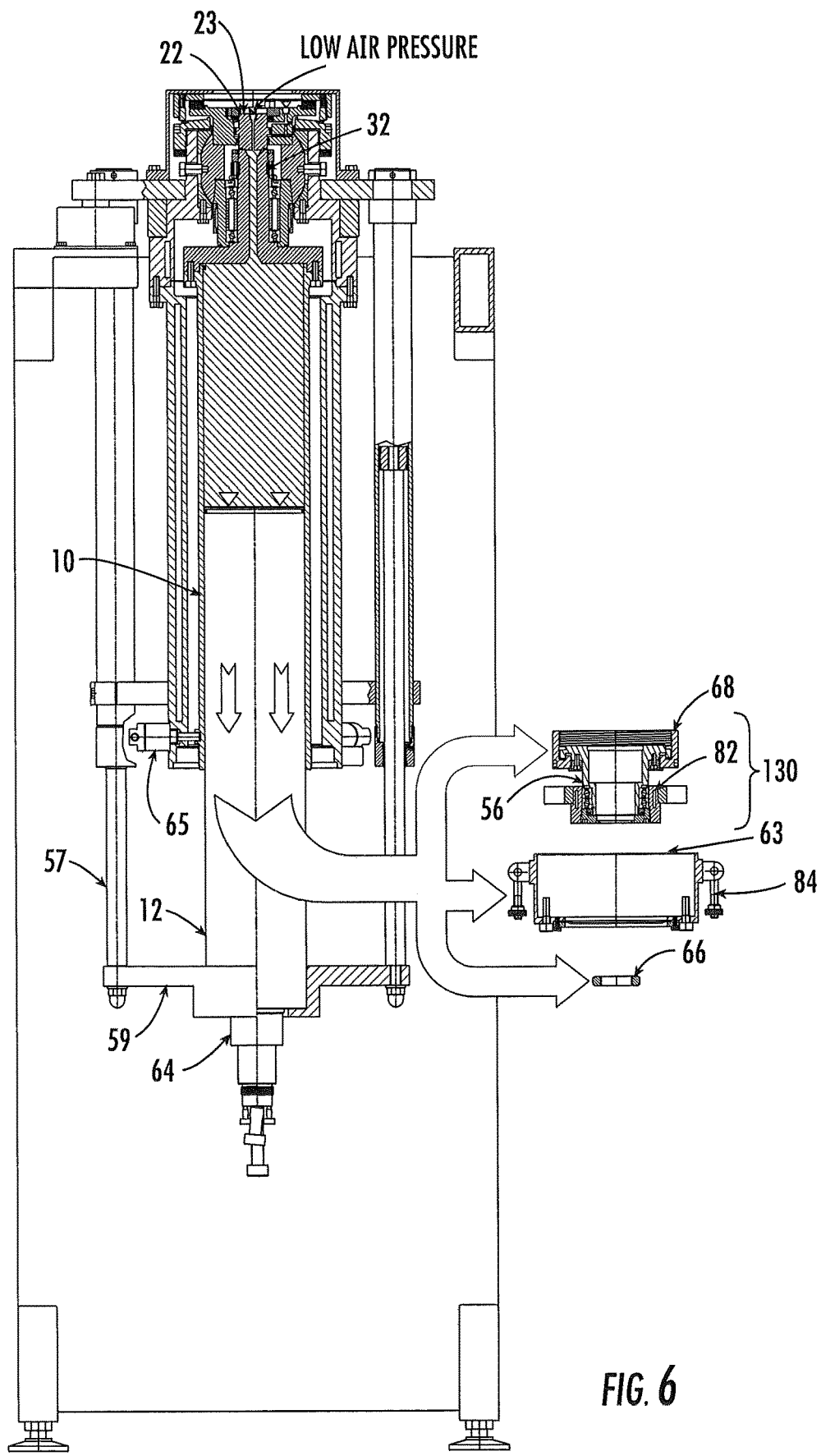
FIG. 6 illustrates an insert removal process.

FIG. 6 illustrates the method for removing the internal cartridge 12 when the outer chamber is full of debris or when the process is finished for other reasons. The locknut 66 which retains the seal assembly is removed first, then the bowl case lower cap 63 is removed by loosening swing bolts 84. The locknut that retains the inner cartridge 68 is removed by first engaging air cylinders 65 to prevent rotation and then using a special spanner (not shown) to unscrew the locknut. Then the entire lower assembly of the bowl 130 can be removed allowing the internal cartridge to be extracted. To remove the cartridge in a controlled fashion, coupling actuator 22 is pushed down to contact the spindle 32 thus forming a seal so that lower pressure air from connection 23 can be used to force the internal cartridge down out of the bowl. The rate of expulsion of the cartridge is controlled by hydraulic cylinders, preferably water driven, and crosshead 59. The cylinders 57 could be electromechanical in alternative embodiments. When the cartridge 12 has been fully expelled from the bowl, it is removed with its seal assembly 64 (FIG. 2) still connected to the cartridge such that aseptic containment is assured. The cartridge and seal assembly is disposed and a new cartridge assembly that has been pre-sterilized, usually by gamma radiation, is installed in the reverse order from above.

Many changes in the details, materials, and arrangement of parts and steps, herein described and illustrated, can be made by those skilled in the art in light of teachings contained herein. Accordingly, it will be understood that the following claims are not to be limited to the embodiments disclosed herein and can include practices other than those specifically described, and are to be interpreted as broadly as allowed under the law.

What is claimed is:

1. A disposable, multi-zone liner for a rotatable cylindrical centrifuge bowl, comprising:
   a cylindrical central core having an outer surface and an axis of symmetry;
   a first cylindrical shell having
      a first shell cylindrical body with inner and outer surfaces,
      a first end having an inner fluid port therein, and
      a second end having a first shell wall with, the first shell cylindrical body having an axis of symmetry coincident with the axis of symmetry of the central core, and surrounding the central core, wherein the first shell wall is orthogonal to the axis of symmetry and extends between the cylindrical body and the central core;
   a second cylindrical shell having
      a second shell cylindrical body with inner and outer surfaces,
      a first end having an outer fluid port therein, and
      a second end having a second shell wall, the second shell cylindrical body having an axis of symmetry coincident with the axis of symmetry of the central core, and surrounding the first shell, wherein the second shell wall is orthogonal to the axis of symmetry and extends between the second shell cylindrical body and the first shell cylindrical body, adjacent the first shell wall;

a plurality of planar vanes disposed between the central core outer surface and the first shell cylindrical body inner surface, and between the first shell cylindrical body outer surface and the second shell cylindrical body inner surface, each vane extending along a majority of the length of the first shell between the first end and the second end thereof and lying in a respective plane that contains the axis of symmetry; and at least one inter-shell channel formed in the first shell wall and the second shell wall to enable fluid flow between the interior of the first cylindrical shell and the second cylindrical shell.

2. The liner of claim 1, wherein the first cylindrical shell, the second cylindrical shell and the plurality of planar vanes are integrally formed.

3. The liner of claim 1, wherein the first cylindrical shell, the second cylindrical shell and the plurality of planar vanes are formed of extruded plastic.

4. The liner of claim 1, wherein the first and second cylindrical shells and the plurality of vanes are configured to enable fluid to flow through the liner.

5. The liner of claim 1, wherein each pair of adjacent vanes forms a respective fluid flow path therebetween with either a portion of the second shell inner surface between the adjacent vanes and a portion of the first shell outer surface between the adjacent vanes or a portion of the first shell inner surface between the adjacent vanes and a portion of the central core outer surface between the adjacent vanes.

6. The liner of claim 1, wherein the central core, the first shell, the second shell and the plurality of vanes are configured to be removable from and insertable into a centrifuge bowl.

* * * * *

UNITED STATES PATENT AND TRADEMARK OFFICE
CERTIFICATE OF CORRECTION

| | | |
|---|---|---|
| PATENT NO. | : 11,135,599 B2 | Page 1 of 1 |
| APPLICATION NO. | : 14/910189 | |
| DATED | : October 5, 2021 | |
| INVENTOR(S) | : Robert Bret Carr et al. | |

It is certified that error appears in the above-identified patent and that said Letters Patent is hereby corrected as shown below:

On the Title Page

Item (12) delete "Carr" and insert --Carr et al--.

Item (72) Please add Jing Liu, Somerville, MA (US) as second Inventor.

Signed and Sealed this
Twenty-first Day of June, 2022

Katherine Kelly Vidal
*Director of the United States Patent and Trademark Office*